United States Patent Office

3,585,139
Patented June 15, 1971

3,585,139
HYDROCARBON OILS CONTAINING 1-AZA BICYCLO ALKANE ADDITIVES
Jack Ryer, East Brunswick, Harold E. Deen and Bruce G. Gillespie, Cranford, and Robert R. Kuhn, Scotch Plains, N.J., assignors to Esso Research and Engineering Company
No Drawing. Continuation-in-part of application Ser. No. 642,197, May 29, 1967. This application Apr. 23, 1969, Ser. No. 818,794
Int. Cl. C01m 1/32; C01l 1/22
U.S. Cl. 252—50               17 Claims

ABSTRACT OF THE DISCLOSURE

Mineral and synthetic oil compositions, such as gasoline, fuels, lubricants, etc., are stabilized against sludge formation, color degradation, etc., by the addition thereto of 1-aza bicyclo alkanes having from 5 to about 9 carbon atoms in the skeletal rings with the aza nitrogen being a bridgehead nitrogen.

CROSS REFERENCE TO RELATED APPLICATION

This application is a continuation-in-part of copending application, Ser. No. 642,197, filed May 29, 1967 and subsequently abandoned.

BACKGROUND OF THE INVENTION

Field of the invention

This invention relates to oil compositions containing 1-aza bicyclo tertiary amine compounds. More particularly, this invention is concerned with the addition of 1-aza bicyclo alkanes having from 5 to about 9 carbon atoms in the skeletal rings to oil compositions such as gasoline, fuel, lubricating oils, etc. The invention especially relates to additives such as 1-aza, 3,7-substituted bicyclo (3.3.0.) octanes and 1-aza, 5,9-substituted bicyclo (3.3.1.) nonanes.

Description of the prior art

Lubricants for modern high compression piston-type internal combustion engines are required to have high detergency, efficient sludge dispersing action and high oxidation resistance in order that those engines will be kept free of varnish, sludge and cokelike deposits. In other words, a heavy duty detergent-type lubricating oil must be employed in such engines in order to maintain a high degree of engine cleanliness and thus promote engine life.

In the past, the majority of detergents, sludge dispersants and antioxidant materials, that have been developed for use in lubricating oils for internal combustion engines, have been metallic derivatives, particularly alkaline earth metal sulfonates, alkaline earth metal salts of alkyl phenol sulfides, colloidal dispersions of metallic carbonates (particularly alkaline earth metal carbonates), and the like. While, in general, additives of these type have proved to be quite satisfactory in their function as sludge dispersants and detergents, in many instances the ash content of these additives has presented a disadvantage in the ash tends to accumulate in the combustion chamber of the engine and there causes preignition, spark plug fouling, valve burning and similar undesirable conditions. For this reason, an effective dispersant that is ash-free is preferable over an ash-forming detergent additive, such as an alkaline earth metal salt of the types mentioned above.

Ash-free dispersants are also of advantage in motor fuels, fuel oil compositions, diesel fuels, jet fuels, etc. For example, fuel oils tend to deteriorate in storage, particularly when they contain cracked hydrocarbon stocks, as they now commonly do. It has been found that, if 10% or more of the fuel oil composition comprises cracked stocks, the formation of sludge or sediment during storage may be markedly increased, leading to the plugging or fouling of oil lines, filters and burner nozzles.

In the past, it has also been proposed to stabilize liquid hydrocarbon compositions with certain various amines. Thus, U.S. 2,832,741 suggests the use of tertiary alkyl amines to stabilize bright stocks; U.S. 2,459,112 teaches the use of the condensation product of an aldehyde, a polyamine and a hydroxyaromatic to improve oxidation stability of mineral oil; and U.S. 3,186,810 teaches that an N-substituted cyclohexylamine acts as an inhibitor of fuel oil deterioration and is particularly effective at elevated temperatures as well as at ordinary temperature.

SUMMARY OF THE INVENTION

It has now been discovered that certain 1-aza bicyclo alkanes, which have not heretofore been employed in oil compositions, are more effective sludge inhibitors than any of the above-mentioned prior art amines.

In accordance with the present invention, the sludge-forming and depositing tendencies of oil compositions can be markedly reduced by incorporating therein minor proportions of a bicyclic tertiary amine which is a 1-aza bicyclo alkane having 5 to about 9 carbon atoms in the skeletal rings, said aza nitrogen being a bridgehead nitrogen. These materials, when added to fluid oil compositions, e.g. gasolines, fuel oils, jet fuel oils, lubricating oils, etc., provide resistance to oxidation, sludge formation, sludge deposition, rust or corrosion resistance, etc.

More specifically, the composition contemplated for use as additives in this invention are those having the structural formula:

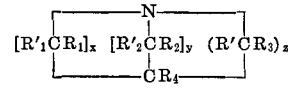

wherein $x$ and $z$ are integers having a value of 1 to 4, $y$ is an integer having a value of 0 to 2, and $x+y+z \leqq 9$. $R'_1$, $R_1$, $R'_3$ and $R_3$ are selected from the group consisting of hydrogen and alkyl, aralkyl, aryl, alkylaryl, cycloaliphatic, alkoxyaryl, hydroxyaryl and aminoaryl radicals containing from 1 to 30 carbon atoms. $R_2$ and $R'_2$ are selected from the group consisting of hydrogen and methyl, aryl, alkyl-substituted aryl and heterogroup-substituted aryl radicals having from 6 to 25 carbon atoms. $R_4$ is selected from the group consisting of hydrogen, a $C_1$–$C_{20}$ alkyl radical, a $C_7$–$C_{25}$ alkylaryl radical, a $C_2$–$C_{20}$ alkenyl radical, a $C_7$–$C_{25}$ aralkyl radical, a $C_6$–$C_{12}$ aryl radical, a $C_2$–$C_{20}$ ether radical, a $C_6$–$C_{15}$ heterogroup-substituted aryl radical, a $C_2$–$C_{18}$ ethylidene radical, and a $C_2$–$C_{18}$ substituted ethylidene radical.

Especially preferred are those compositions wherein $x$ and $z$ are integers having a value of 3 and $y$ is an integer having a value of 0 or 1.

The more preferred 1-aza bicyclo (3.3.0.) octane additives of the present invention may be described as fully or partially 3,7-substituted compounds having the structural formula:

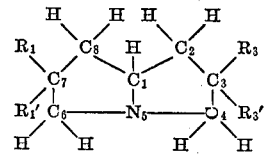

wherein $R_1$, $R_1'$, $R_3$ and $R_3'$ are each selected from the group consisting of hydrogen and alkyl, aralkyl, aryl, alkylaryl, cycloaliphatic, alkoxyaryl, hydroxyaryl and aminoaryl containing from 1 to 30 carbon atoms, provided, however, that at least one of the groups of $R_1$, $R_1'$, $R_3$ and $R_3'$ is selected from the group consisting of alkyl, aralkyl, aryl, alkylaryl, cycloaliphatic, alkoxyaryl, hydroxyaryl and aminoaryl containing 1 to 30 carbon atoms. It is preferred, however, that $R_1$, $R_1'$, $R_3$ and $R_3'$ be hydrogen or $C_1-C_{16}$ alkyl. As examples of substituents which can be attached at the 3 and/or 7 positions, there may be mentioned methyl, ethyl, propyl, butyl, hexyl, octyl, decyl, dodecyl, benzyl, phenyl, cyclohexyl, isopropyl, amyl, p-methylphenyl, p-methoxyphenyl, m-hydroxyphenyl and o-aminophenyl. The compounds of the instant invention can be either mono-substituted at the 3 or 7 position, di-substituted at the 3 or 7 position, mono-substituted at the 3 and 7 position or di-substituted at the 3 and 7 positions. It is preferred, however, that the additive be mono- or di-substituted at both the 3 and 7 positions.

The above additives may be prepared by a process as described in copending, commonly assigned application, Serial No. 721,560, filed Apr. 10, 1968, now U.S. Pat. 3,544,590, which application is herein incorporated in its entirety by express reference although so much of it as is necessary to understand the invention will be repeated. However, it is to be understood that the method of preparation of the additive compounds does not constitute a part of the inventive concept embodied in this application. In general, the additive materials may be prepared by hydrogenating a substituted 1,4-pentadiene-3-one in the presence of a catalyst such as any of the well-known hydrogenation catalysts. Catalysts which can be used include Ni, Pt, PtO₂, Rh, Ru or Pd. A preferred catalyst would comprise a mixture of Ni and PtO₂ or Ru. During the hydrogenation process, the hydrogen pressure is at least 150 p.s.i.g. A preferred range is from 200 to 2000 p.s.i.g. The temperature range for the hydrogenation step is at least 125° C., preferably from 150° to 275° C.

The preferred 1-aza bicyclo nonane additives of the present invention may be described as substituted compounds having the structural formula:

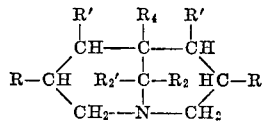

wherein R and R' are selected from the group consisting of hydrogen and methyl radicals, $R_2$ and $R_2'$ are selected from the group consisting of hydrogen and methyl, aryl, alkyl, substituted aryl and heterogroup substituted aryl radicals having from 6 to 25 carbon atoms, and $R_4$ is selected from the group consisting of hydrogen, a $C_1-C_{20}$ alkyl radical, a $C_7-C_{25}$ alkylaryl radical, a $C_2-C_{20}$ alkenyl radical, a $C_7-C_{25}$ aralkyl radical, a $C_6-C_{12}$ aryl radical, a $C_2-C_{20}$ ether radical, a $C_6-C_{15}$ heterogroup substituted aryl radical, a $C_2-C_{18}$ ethylidene radical, and a $C_2-C_{18}$ substituted ethylidene radical. These additives may be prepared by a process as described in copending, commonly assigned application, Ser. No. 768,540, filed Oct. 17, 1968, which application is herein incorporated in its entirety by express reference although so much of it as is necessary to understand the invention will be repeated. In general, these additive materials may be prepared by a process in which keto-dinitriles, trinitrile keto-diamino or triamino compositions are catalytically hydrogenated in the presence of a solvent to secure substituted primary, secondary or primary, tertiary monocyclic diamines (aminopiperidines and aminotetrahydropyridines) and tertiary bicyclic amines (bicyclo nonane compounds). The starting trinitrile and keto-dinitrile compounds are desirably produced by cyano-ethylating either a ketone or a mono-nitrile compound. The triamino and keto-diamino materials are obtained by hydrogenation of the nitrile compounds.

The subsequent hydrogenation of the trinitrile organic compounds or the triamino compounds yields a substituted 1-aza compound. The hydrogenation operation is conducted employing conventional hydrogenation catalysts at moderate to rigorous temperature and hydrogen pressure conditions. The overall reactions which produce these additives are set forth below:

(I)

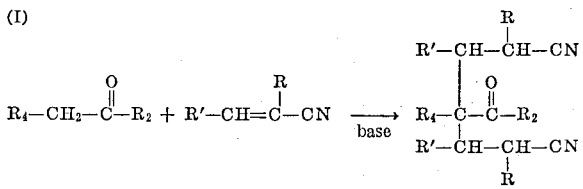

(II)

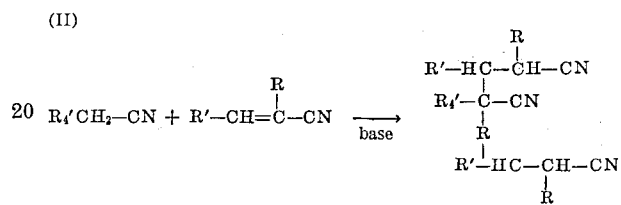

(III)

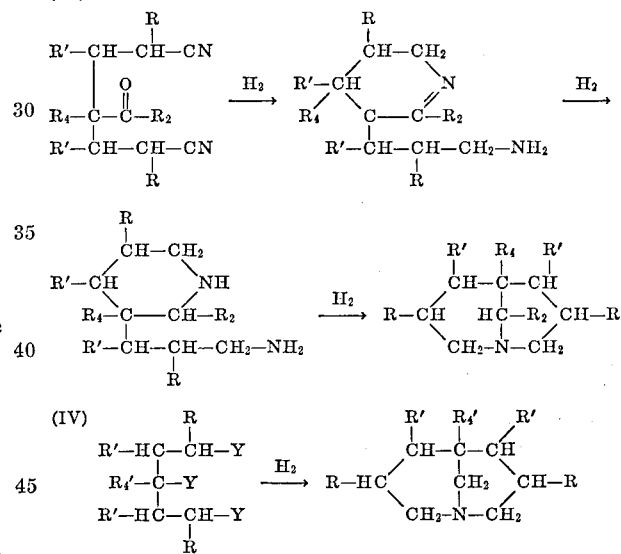

(IV)

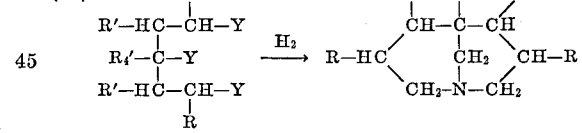

In Equation I is shown the reaction of a ketone compound with an acrylonitrile-based material in order to secure a keto-dinitrile compound. In Equation II is shown the cyanoethylation of a mononitrile compound to secure an organotrinitrile material. The reactions illustrated by Equations I and II are described in more detail in "Organic Reactions," volume V, John Wiley & Sons, Inc. (1952) pp. 79–135. The corresponding keto-diamino and triamino compositions are secured by hydrogenating the nitriles. Equation III illustrates the hydrogenation of a model compound such as the keto-dinitrile formed pursuant to Equation I to a substituted bicyclo nonane material. Intermediate to the formation of the bicyclo nonane compound are, first of all, a substitued alkylamino tetrahydropyridine compound and, secondly, a substituted alkylaminopiperidine compound. Lastly, in Equation IV is shown the hydrogenation of a model compound such as the trinitrile compound formed pursuant to Equation II to a substituted 1-aza bicyclo nonane compound. In Equations III and IV, "Y" designated either a nitrile (—CN) radical or a methyl amino (—CH₂NH₂) radical.

The mononitrile compounds utilized in Equations I and II to form either the trinitrile compounds or the keto-dinitrile compounds may be acrylonitrile, crotonitrile or methacrylonitrile. Hence, R and R' may both be hydrogen atoms or one hydrogen atom and one methyl radical. The reaction does not proceed in a favorable manner if both R and R' are methyl radicals.

Many differing kinds of organic monoketone compounds can be employed as the starting material in Equation I for the production of the keto-dinitrile compounds (which can be converted to keto-amino compounds). In general, the $R_4$ of the monoketone compound may be a monovalent organic radical having from 1 to 20, preferably from 1 to 15, carbon atoms per radical. More particularly, $R_4$ may be a monovalent alkyl radical having from 1 to 20, preferably from 1 to 12, carbon atoms, e.g., methyl, isopropyl, hexyl, cyclohexyl, 2-ethylhexyl, isononyl, dodecyl, etc.; a monovalent alkenyl radical having from 2 to 20, preferably 2 to 12, carbon atoms per radical, e.g., ethylene, isopropenyl, pentenyl, octenyl, etc.; a monovalent aryl radical having from 6 to 12 carbon atoms, e.g., phenyl and naphthyl; a monovalent heterogroup substituted aryl radical having from 6 to 15 carbon atoms, e.g., nitrophenyl, methoxyphenyl, cyanophenyl, nitronaphthyl, etc.; a methoxyphenyl, cyanophenyl, nitronaphthyl, etc.; a monovalent alkylaryl radical having from 7 to 25, preferably 7 to 18, carbon atoms per radical, e.g., tolyl, ethylphenyl, diisobutylphenyl, triethylnaphthyl, etc.; a monovalent aralkyl radical having from 7 to 25, preferably 7 to 18, carbon atoms, e.g., benzyl, 3-phenylpropyl, 4 - phenyloctyl, 3 - naphthylethyl, 3,4 - diphenylpentyl, etc.; and monovalent ether radicals, in particular monovalent ether radicals having from 2 to 20, preferably 2 to 15, carbon atoms, e.g., phenoxymethyl, 3-phenoxypropyl, 2-oxapropyl, 3-oxabutyl, 3-oxadodecyl, 2-oxa-4-methylpentyl. It is preferred, however, that the $R_4$ be a $C_1$–$C_{12}$ monovalent alkyl radical.

Many different varieties of organic mononitrile compounds can be employed as per Equation II to secure trinitrile compounds (which can be converted to the subject amino radical containing compounds). As noted in Equation II, useful mononitrile materials have the general formula $R_4CH_x$—CN. Thus, the $R_4$ of the mononitrile compound may be a monovalent or divalent organic radical having from 2 to 25, preferably 2 to 18, carbon atoms and "$x$" is 1 or 2. Preferably $R_4$ in said reaction will be an aryl radical, an alkylaryl radical, a heterogroup substituted aryl radical, an ethylidene radical

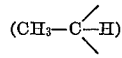

or a susbtituted ethylidene radical. Typical aryl radicals include phenyl and naphthyl radicals. Suitable alkylaryl radicals have from 7 to 25, preferably 7 to 18 carbon atoms per radical, e.g., ethylphenyl, tolyl, tributylphenyl, octylphenyl, dodecylphenyl, dipropylnaphthyl, etc. Useful substituted aryl compositions include cyanophenyl, nitrophenyl, hydroxy phenyl, methoxyphenyl, etc. Typical ethylidene and substituted ethylidene radicals include β-phenylethylidene, α-methylethylidene, β-(p-cyanophenyl) ethylidene, β-(o-methoxyphenyl)ethylidene, β-(p-nitrophenyl)ethylidene, etc.

The value of $R_2$ and $R'_2$ can also vary over a wide range. For example, $R_2$ or $R'_2$ can be hydrogen or a monovalent $C_1$–$C_{10}$ alkyl radical, a $C_8$–$C_{25}$ aryl radical, or alkyl or heterogroup substituted aryl radical having from 6 to 25 carbon atoms. Useful aryl radicals include phenyl and naphthyl radicals. Useful alkylaryl radicals are compositions having from 7 to 25, preferably 7 to 16, carbon atoms per radical, e.g., methylphenyl, diethylphenyl, diisobutylphenyl, trimethylphenyl, nonylphenyl, triethylnaphthyl, nitrophenyl, methoxyphenyl, cyanophenyl, etc. Especially preferred, however, are compositions in which $R_2$ and $R'_2$ are a hydrogen and a methyl radical respectively. Especially preferred among the 1-aza-bicyclononanes are the 1-aza 9-methyl-5 $C_1$–$C_{12}$ alkyl substituted (3.3.1.) nonane additives. Among these, 1-aza 5-isopropyl-9-methyl bicyclo (3.3.1) nonane is most preferred.

The additives of this invention may generally be employed in concentrations ranging from about 0.0005 to about 10, preferably 0.001 to 5 wt. percent (based on weight of oil base) in mineral or synthetic oil compositions ranging from gasoline fractions through middle distillate fuels and lubricating oils.

For use as lubricating oil additives the reaction products of this invention will ordinarily be used in concentrations of from about 0.1 to about 5 wt. percent. The lubricating oils to which the additives of the invention may be added include not only mineral lubricating oils, but synthetic oils also. The mineral lubricating oils may be of any preferred types, including those derived from the ordinary paraffinic, naphthenic, asphaltic, or mixed base mineral crude oils by suitable refining methods. Synthetic hydrocarbon lubricating oils may also be employed. Other synthetic oils include dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, and complex esters as, for example, the complex ester formed by the reaction of one mole of sebacic acid with two moles of tetraethylene glycol and two moles of 2-ethyl hexanoic acid.

The additives of this invention may also be employed in middle distillate fuels for inhibiting corrosion and the formation of sludge and sediment in such fuels. Ordinarily, concentration ranges of from about 0.002 to about 2 wt. percent, more preferably from about 0.005 to about 0.2 wt. percent, are employed.

The most common petroleum middle distillate fuels such as kerosene, diesel fuels, jet fuels, heating oils and petroleum distillate fuels boiling in the range of from about 200° to about 700° F. are contemplated. Typical of such fuels are No. 1 and No. 2 fuel oils that meet ASTM Specification D–396–48T, diesel fuels qualifying as Grades 1D, 2D and 4D of ASTM Specification D975–51T, and various jet engine fuels. Because they are ashless, these additives are particularly desirable for such fuels in that they do not give rise to glowing ashes nor detract from the burning qualities of the distillates. These additives may also be used in conjunction with other prior art ashless additives for fuels, such as polymers of acrylic or methacrylic acid esters, high molecular weight aliphatic amines, etc.

The additives of this invention may also be employed, either alone or in combination with other hydrocarbon-soluble additives, in jet fuels and gasolines in concentrations usually ranging from about 0.001 to 1.0 wt. percent as detergent and/or rust preventive additives.

In either the fuel or lubricant compositions, other conventional additives may also be present, including dyes, pour point depressants, antiwear agents, e.g., tricresyl phosphate, zinc dialkyl dithiophosphates of 3 to 8 carbon atoms, antioxidants such as phenyl-alpha-naphthylamine, tertiary octylphenol sulfide, bis-phenols such as 4,4'-methylene bis (2,6-ditertiary butylphenol), viscosity index improvers such as polymethacrylates, polyisobutylene, alkyl fumarate-vinyl acetate copolymers, and the like, as well as other dispersants.

It is within the contemplation of this invention to prepare additive concentrates in which the concentration of additive is greater than would normally be employed in a finished oil composition. The concentrates may contain in the range of from 10 to 80% of additive on an active ingredient basis, the balance being mineral oil or some other suitable hydrocarbon solvent such as hexane, heptane, etc. Such concentrates are convenient for handling the additive in the ultimate blending operation into a finished lubricating or fuel composition. The additive concentrates may be made up simply of an additive of the present invention in a suitable mineral oil medium or they may include other additives that are intended for use along with the additives of the invention in a finished lubricant. Thus, if the additives are to be used in conjunction with conventional detergents, an additive concentrate can be prepared containing, say, 30 to 60 wt. percent of an additive of the invention and 5 to 20 wt. percent of a metal sulfonate, e.g., calcium petroleum sulfonate from sulfonic acids of about 450 molecular weight, or a metal alkylphenol sulfide, e.g., calcium nonylphenol sulfide, with the balance being a mineral lubricating oil. Additionally, 5 to 15 wt. percent of an antiwear agent such as a zinc dialkyldithiophosphate, e.g., mixed zinc butyl and amyl dithiophosphates may also be present in the additive concentrate package.

While the compositions herein described are primarily designed as automotive crankcase lubricants, fuels, heating oils, etc., the additives of the invention may also be employed in other hydrocarbon oil compositions, including turbine oils, various industrial oils, gear oils, hydraulic fluids, transmission fluids, and the like. Further, the present invention contemplates the use of the additive in hydrocarbon process streams subjected to elevated temperatures, i.e., use as an antifoulant additive.

The invention can be more fully understood by reference to the following examples.

EXAMPLE 1

In to a three-liter round bottom flask equipped with a mechanical stirrer, thermometer, and an additional funnel were introduced 262 grams (2.76 moles) of mesityl oxide, 267 milliliters of t-butyl alcohol, 267 milliliters of isopropyl ether and 19 milliliters of a commercial 50% methanolic solution of a choline base $$[HOCH_2CH_2N+(CH_3)_3]OH)$$

In the addition funnel was placed a mixture of 299 grams (5.34 moles) of acrylonitrile, 133 milliliters of t-butyl alcohol and 133 milliliters of isopropyl ether. The acrylonitrile solution was introduced to the flask under continuous stirring. During acrylonitrile addition, the reaction mixture was maintained at a temperature ranging from 5° to 7° C. with the aid of a cooling bath of isopropyl alcohol and solid $CO_2$. The addition was carried out for a period of 1.5 hours during which time the solid dinitrile product precipitated, forming a cream colored slurry. Stirring and cooling was continued for an additional 1.5 hours. Thereafter 270 milliliters of water were added and stirring continued for an additional 0.25 hour at 15° C. The slurry was then filtered, the solids washed once with 600 milliliters of water and reslurried with 600 milliliters of water at 45° to 50° C. This final slurry was then filtered and the solids air dried, resulting in 452 grams (83 mole percent yield) of gamma-acetyl-gamma-isopropenyl pimelonitrile. The product exhibited a melting point of 108° C.

Into a three-liter stainless steel rocking autoclave were then placed 200 grams (0.98 mole) of the previously formed ketodinitrile along with 500 milliliters of t-butyl alcohol and 20 grams of Raney nickel catalyst. The catalyst was washed with isopropyl alcohol prior to introduction into the reactor. The air contained in the autoclave was then purged by introducing nitrogen. Later, the nitrogen was removed from the system by flushing the autoclave with hydrogen and thereafter the reactor was pressurized with hydrogen to 1800 p.s.i. Rocking of the autoclave was commenced and the temperature of the autoclave raised from about 20° C. to 120° C. in about 0.5 hour during which period the absorption of hydrogen began. The autoclave was maintained at 120° C. and rocking continued for four hours. Thereafter the bomb temperature was raised from 120° to 230° C. in about 45 minutes and maintained at this level for 5 hours. Hydrogen pressure throughout the reaction period ranged between 1400 and 2000 p.s.i. Upon completion of the 5-hour heating period, the autoclave was permitted to cool to room temperature. Thereafter, the contents of the autoclave were filtered to remove the catalyst and the filtrate fractionated at a reduced pressure. After removal of solvent, 133 grams (75 mole percent yield) of 1-aza-5-isopropyl-9-methyl bicyclo[3.3.1]nonane was secured. The material exhibited a boiling point of 67° C. at 0.3 millimeter of mercury pressure a $pK_b$ of 2.7.

The product recovered was subjected to a carbon, hydrogen and nitrogen analysis and was found to contain 79.83 wt. percent carbon, 12.72 wt. percent hydrogen and 7.53 wt. percent nitrogen. The actual bicyclononane product thought to have been formed would contain 79.49 wt. percent carbon, 12.78 wt. percent hydrogen and 7.72 wt. percent nitrogen. The infra-red spectrum of the product indicated the absence of amine hydrogens and the NMR spectrum revealed doublets at 0.72 and 0.78 part per million (p.p.m.) which indicates the C-5-isopropyl group and a doublet at 1.1 p.p.m. representing the C-9-methyl group. A multiplet at 2.9 p.p.m. is in accordance with the presence of the hydrogen located alpha to the nitrogen atom. On the basis of this experimental evidence, the following structure was assigned to the amine.

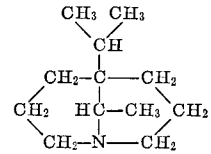

The bicyclononane product was found to be only slightly soluble in water but soluble in aliphatic and aromatic hydrocarbons, ketones, alcohols, chlorinated solvents and ethers.

EXAMPLE 2

Two hundred and fifteen grams (g.) of acrylonitrile (4.04 moles) were mixed with 50 milliliters (ml.) of t-butyl alcohol and 50 ml. of isopropyl ether and introduced dropwise with constant stirring to a mixture of 145 g. (2.01 moles) of 2-butanone, 200 ml. of t-butyl alcohol, 200 ml. of isopropyl ether and 3 ml. of a 30% methanolic solution of potassium hydroxide. The temperature throughout the addition, which was conducted over a 2-hour period, was maintained between 5° to 7° C. The slurry resulting from the reaction was stirred for an additional two hours after which time 200 ml. of water were added. The solid gamma-acetyl-gamma-methylpimelonitrile was filtered, washed twice with 200 ml. of water and air dried. Approximately 329 g. of the keto-dinitrile (92 mole percent yield) were recovered. The material exhibited a melting point of 65° C.

A solution of 200 g. of the previously prepared keto-dinitrile contained in 500 ml. of tetrahydrofuran was introduced into a 3-liter, stainless steel autoclave together with 15 g. of Raney cobalt catalyst. The autoclave was first flushed with nitrogen followed by a flushing with hydrogen and was finally pressurized to 2500 p.s.i. with hydrogen. The autoclave was raised to a temperature of 120° C. and was maintained at this level for 8 hours during which period the hydrogen pressure within the autoclave ranged from a maximum of 3200 p.s.i. to a minimum of 2200 p.s.i. Following the reaction period, the autoclave was cooled to room temperature and 20 g. of supported nickel catalyst were carefully introduced into the reaction mixture. The autoclave was repressurized with 1000 p.s.i. of hydrogen, heated to 230° and maintained at this level for 10 hours. Reaction pressures varied between 1000 and 2000 p.s.i. Distillation of the resulting product gave 139.8 g. (81.5 mole percent yield) of 1-aza-5,9-dimethyl-bicyclo(3.3.1.)nonane. This product exhibited a boiling point of 80° C. at 8 millimeters of mercury pressure and a melting point of 21° C. The product was found to contain 78.52 wt. percent carbon, 12.73 wt. percent hydrogen, and 9.3 wt. percent nitrogen. The product thought to have been secured would contain 78.37 wt. percent carbon, 12.49 wt. percent hydrogen and 9.14 wt. percent nitrogen.

The infra-red spectrum of the product indicated the absence of amine hydrogens and the NMR spectrum showed a singlet of 0.65 p.p.m. representing the $C_5$ methyl group. The spectrum further showed a doublet at 1.1 p.p.m. indicative of the $C_9$ methyl group and a multiplet at 3.0 p.p.m. which corresponds to the hydrogens located alpha to the nitrogen atom. The $pK_b$ of the amine was found to be 2.7 and the neutralization equivalent 152.5 (Theory 153.2). On the basis of the experimental data, the following structure was assigned to the amine.

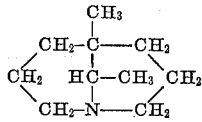

The bicyclic amine is partially soluble in water but completely soluble in aliphatic and aromatic hydrocarbons as well as alcohols, ketones, ethers and chlorinated hydrocarbons.

EXAMPLE 3

Preparation of 2(3-amino-2,2-dimethyl propyl) 4,4-dimethyl-4,5-dihydro-3H pyrrole (a)

150 grams of phorone dinitrile (obtained by the addition of HCN to 2,6-dimethyl 2,5-heptadiene 4-one [phorone]) were added to absolute ethanol which had been saturated with ammonia, and 7 grams of Raney Ni were added. This mixture was charged to a rocking autoclave. The hydrogen pressure varied from 350 to 1500 p.s.i.g. and the temperature from 80° to 162° C. Hydrogen uptake stopped within 5 hours. After removal of catalyst and solvent, the product was fractionated giving 91.8 grams distilling at 112° C. at 10 mm. mercury absolute. Elemental analysis gave C, 72.7%, H, 12.4%, and N, 15.9% density at 23° C., 0.8897, refractive index at 20° 1.4679.

Infrared (I.R.) and nuclear magnetic resonance (N.M.R.) spectra showed that the product exists in either of two forms in equilibrium or more substantially in one or the other form depending on whether they are admixed with a polar or nonpolar solvent. These structures are represented by the formulae:

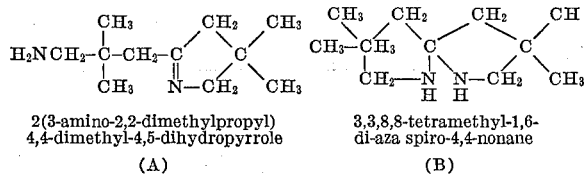

2(3-amino-2,2-dimethylpropyl) 4,4-dimethyl-4,5-dihydropyrrole (A)

3,3,8,8-tetramethyl-1,6-di-aza spiro-4,4-nonane (B)

If other substituted 1,4-pentadiene 3-ones are reacted with HCN and subsequently reduced, compound A may have other substituents in the 2 position of the 4,5-dihydropyrrole ring. The same would apply to the 3 and 8 positions of the 1,6-diaza spiro-4,4-nonane.

EXAMPLE 4

Preparation of 1-aza 3,3,7,7-tetramethyl bicyclo (3.3.0) octane from (A) and/or (B)

320 grams of (A) and/or (B), 500 grams of tetrahydrofuran, 2 grams of platinum oxide and 4 grams of Raney Ni were charged to a high pressure autoclave. The reactor was pressured to 400 p.s.i.g. with hydrogen and, while rocking, was heated to 250° C. Reaction was continued for eight hours, after which it was cooled and the catalyst filtered off. After stripping off the solvent, the residue was fractionated under reduced pressure. There was recovered 201 grams of product distilling at 67° to 68° C. at 10 mm. Hg absolute. Analysis showed 8.14% N, 78.3% C, 12.8% H. Its structure was verified by I.R. and N.M.R.

EXAMPLE 5

Using as the base oil a blend of a solvent neutral mineral oil having a viscosity of 110 SSU at 100° F. and a viscosity index of about 104 (Oil A) and a solvent neutral mineral oil having a viscosity of 445 SSU at 100° F. and a viscosity index of about 100 (Oil B), the following compositions shown in Table I were prepared:

TABLE I

| Oil composition | Composition (weight percent) | | |
| --- | --- | --- | --- |
| | A | B | C |
| Oil A | 74.28 | 75.28 | 74.28 |
| Oil B | 7.72 | 7.72 | 7.72 |
| PIBSA/TEPA/acetic acid condensate [1] | 3.78 | 37.8 | 4.78 |
| Calcium sulfonate [2] | 1.22 | 1.22 | 1.22 |
| Zinc dialkyl dithiophosphate [3] | 1.00 | 1.00 | 1.00 |
| Polyisobutene [4] | 10.59 | 10.59 | 10.59 |
| Wax naphthalene condensate plus VAc copolymer [5] | 0.50 | 0.50 | 0.50 |
| 1-aza 3,3,7,7-tetramethyl bicyclo (3.3.0.) octane (product of Ex. 4) | 1.00 | | |

[1] 65 wt. percent of condensate product of 1.8 moles polyisobutylene succinic anhydride of about 1,000 mol. wt. plus 1.0 mol tetraethylene pentamine plus 1.0 mol acetic acid and 35 wt. percent mineral oil; total product has nitrogen content of 1.8 wt. percent.
[2] 55 wt. percent of $C_{24}$ alkyl benzene sulfonic acid overbased with calcium carbonate, and 45 wt. percent mineral oil.
[3] 75 wt. percent zinc dialkyldithiophosphate prepared by treating a mixture of isobutanol and mixed amyl alcohols with $P_2S_5$ followed by neutralizing with zinc oxide, and 25 wt. percent mineral oil.
[4] 20 vol. percent polyisobutylene (about 18,000 mol. wt.) and 80 vol. percent mineral oil.
[5] 75 vol. percent of component 1 and 25 vol. percent of component 2 wherein component 1 is 50 vol. percent of Friedel-Crafts condensation product of 4 moles chlorinated 170° F.M.P. wax containing 12 wt. percent chlorine with 1 mol. naphthalene and 50 vol. percent mineral oil and component 2 is 50 vol. percent Lorol-7 fumarate-vinyl acetate copolymer and 50 vol. percent mineral oil.

Compositions A, B and C were each tested for sludge dispersing ability in a Cyclic Temperature Sludge Test which, from prior experience, has been shown to give sludge deposits similar to those obtained in stop-and-go driving such as would be experienced in taxicab operation. Briefly described, in this test a Ford 6-cylinder engine is run on a dynamometer stand through alternate cycles, the first cycle lasting 5 hours, at 1500 r.p.m., and the second cycle lasting 2 hours, at the same operating speed, with the oil sump and water jacket temperatures being slightly higher in the second cycle than in the first. The two cycles are alternated in sequence until the desired total test time has elapsed. Make-up oil is added as required so as to maintain the oil level in the crankcase at all times between about 3½ and 4 quarts. At the end of selected periods of test time, the engine is inspected by dissassembling it sufficiently to permit visual examination of several of the parts, including the rocker arm assembly, the rocker arm cover, the cylinder head, the push rod chamber and its cover, the crankshaft and the oil pan. These parts are visually and quantitatively rated for sludge deposits, using a CRC sludge merit rating system in which a numerical rating of 10 represents a perfectly clean part, and the numerical scale decreases to a minimum value representing a part covered with the maximum amount of sludge possible. The several merit ratings are averaged to give an overall engine merit rating.

The results of the cyclic temperature sludge test when using Compositions A, B and C are summarized in Table II.

TABLE II.—SLUDGE MERIT RATINGS (CYCLIC TEMPERATURE TEST)
[Sludge rating (10=clean)]

| | Composition | | |
| --- | --- | --- | --- |
| | A | B | C |
| Test hours: | | | |
| 63 | 9.76 | 9.26 | 9.60 |
| 84 | 9.58 | 6.80 | 9.15 |
| 105 | 9.22 | 5.85 | 8.10 |
| 126 | 9.10 | | 5.60 |
| 147 | 8.42 | | |
| 168 | 7.17 | | |
| 189 | 6.86 | | |
| 210 | 6.10 | | |

It will be seen from these results that incorporation of the additive of this invention greatly increased the engine life of the oil blend. In other words, the base blend containing 1.0 wt. percent 1-aza-3,3,7,7-tetramethyl bicyclo (3.3.0) octane (Composition A) had an engine life about double that of the base blend (Composition B) and was vastly superior to the base blend containing an additional 1.0 wt. percent of the PIBSA/TEPA/Acetic Acid Condensate dispersant (Composition C).

EXAMPLE 6

A commercial fuel oil was selected for stability tests using the oil itself as well as a blend of the oil containing various amounts of 1-aza-3,3,7,7-tetramethyl bicyclo (3.3.0) octane. The oil was a blend of 50% virgin distillate and 50% cracked stock. Typical inspections for this type of oil are as follows:

| | |
|---|---|
| Gravity, API | 30–33 |
| Color (Tag Robinson) | 10 |
| Flash, ° F. | 130 |
| Sulfur (percent) | 1.0 |
| Aniline point, ° F. | 136 |
| Dist. I.B.P. (° F.) | 315 |
| 10% | 392 |
| 50% | 479 |
| 90% | 581 |
| F.B.P. | 660 |

The base fuel and the additive blend were subjected to a stability test which consisted of storing the fuel oil at 300° F. for a period of 90 minutes (Santa Fe Stability Test) (Also known as the "Union Pacific" test or the "Nalco" test). In this test, 50 ml. samples of the test fuel are heated at 300° F. for 90 minutes (in an oil bath or oven) and then cooled to room temperature and filtered through 0.25 cm. No. 1 Whatman paper. Performance of the fuels is expressed in terms of a visual rating scale of 1 to 20 based on the amount of material on the filter paper. The lower the rating, the more stable the fuel. (7 is considered passing.) Color is also rated and the lower the number, the less the fuel degradation.

Table III sets forth the data obtained in these tests:

TABLE III—ACCELERATED STORAGE STABILITY TEST

| Additive | Additive concentration, p.t.b.[1] | Blotter rating | ASTM color[2] |
|---|---|---|---|
| None | | 17 | Black |
| 1-aza-3,3,7,7-tetramethyl bicyclo (3.3.0.) octane | 10 | 4 | 3.5 |
| Do | 15 | 1 | 2.5+ |
| Do | 20 | 1 | 2.5 |

[1] Pounds per thousand barrels.
[2] ASTM D–1500.

It will be noted from the data in Table III that the additive of this invention was very effective in preventing sludge formation and color degradation in a typical fuel oil.

EXAMPLE 7

A commercial heating oil was selected for storage tests using the oil itself as well as a blend of the oil containing various amounts of different stability imparting amine additives. The oil was a Baton Rouge No. 2 heating oil having a boiling range of 350° to 620° F. and consisting of a blend of 85% light cracked cycle and 15% straight run. In this test, fuel is stored at 110° F. for 12 weeks in Erlenmeyer flasks. One week in 110° F. storage is considered approximately equivalent to one month in normal field storage. At the end of this period, the insoluble residue or sediment is measured.

Table IV sets forth the data obtained in these tests:

TABLE IV.—110° F. STORAGE TEST/12 WEEKS

| Additive | Lbs./ 1,000 bbl. | Insoluble residue, mg./100 ml. |
|---|---|---|
| None | | 5.22 |
| Additive A [1] | 10 | 1.2 |
| Additive B [2] | 15 | 3.5 |
| 1-aza-3,3,7,7-tetramethyl bicyclo (3.3.0.) octane (product of Ex. 4) | 10 | 0.4 |
| Additive C [3] | 9 | 0.8 |

[1] Commercial mixture of $C_{12}$-$C_{14}$ tertiary alkyl primary amines (sold by Rohm & Haas as "Primine" 81-R); disclosed as a stabilizer against color and sediment in bright stocks (U.S. 2,832,741) fuel oils (2,945,749) and as thermal stabilizers in jet fuels (t-alkyl primary amines, Rohm & Haas Co., Philadelphia, Pa.; 1963, page 15). The molecular weight of this mixture of amines was 185–213, the specific gravity 0.813, the neutralization equivalent 191 and the flash point 205° F.
[2] Condensations product of 2 moles of formaldehyde, 1 mole of ethylene diamine and 2 moles of nonylphenol (described in U.S. 2,459,112 as improving the oxidation stability of mineral oils) (resulting composition is mixture of 2° plus 3° amines).
[3] Mixture of about 88–91 wt. percent N,N-dimethylcyclohexylamine and 9–12 wt. percent N-methylcyclohexylamine, sold by Du Pont under the trade name "FOA-3" and described as an outstanding antioxidant for diesel and fuel oils; (characterized by the following typical properties: density, g./ml. at 77° F.=0.85; base number (TBN-E), mg. KOH/g.=425; viscosity, cs. at 210° F.=0.63; viscosity, cs. at 77° F.=1.43; and viscosity, cs. at 0° F.=3.28).

EXAMPLE 8

A base heating oil comprised of 76.5% light cracked stock, 13.5% virgin gas oil and 10% coker distillate was selected for stability tests using the oil itself as well as a blend of the oil containing different amine additives.

The test (known as the "Nalco Test," "Santa Fe Stability Test" or the "Union Pacific Test") consisted of heating 50 ml. samples at 300° F. for 90 minutes, cooling the samples to room temperature and then filtering the samples through .25 cm. No. 1 Whatman paper. Performance of the fuels is expressed in terms of a visual rating scale of 1 to 20 based on the amount of material deposited on the filter paper. The lower the rating, the more stable the fuel.

Table V sets forth the data obtained in these tests.

TABLE V.—SANTA FE STABILITY TEST

| Additive | Lbs./ 1,000 bbl. | Blotter rating |
|---|---|---|
| None | | 8 |
| Additive A | 10 | 8 |
| Additive B | 10 | 4 |
| Piperidine | 10 | 4 |
| 1-aza-3,3,7,7-tetramethylbicyclo (3.3.0.) octane | 10 | 2 |
| 1-aza-5,9-dimethylbicyclo (3.3.1.) nonane (product of Ex. 2) | 10 | 3 |

Additive A—Mixture of about 88–91 wt. percent N,N-dimethylcyclohexylamine and 9–12 wt. percent N-methylcyclohexylamine, sold by du Pont under the trade name FOA-3 and described as an "outstanding antioxidant for diesel and fuel oils"; (characterized by the following typical properties: density, g./ml. at 77° F.=0.85; base number (TBN-E) mg. KOH/g.=425; viscosity, cs. at 210° F.=0.63; viscosity, cs. at 77° F.=1.43; and viscosity, cs. at 0° F.=3.28);

Additive B—Commercial mixture of $C_{12}$-$C_{14}$ tertiary alkyl primary amines (sold by Rohm & Haas as "Primine" 81-R). Disclosed as a stabilizer against color and sediment in bright stocks (U.S. 2,832,741), fuel oils (2,945,749), and as a thermal stabilizer in jet fuels (t-alkyl primary amines, Rohm & Haas Co., Phila., Pa.; 1963, page 15). The molecular weight of this mixture of amines was 185–213, the specific gravity 0.813, the neutralization equivalent 191 and the flash point 205° F.

It will be noted from Table IV and Table V that when piperidine or commercially accepted antioxidant amines are placed in heating oils, the resulting products are substantially and unexpectedly inferior to the fuel compositions of the present invention in terms of thermal and oxidation stability.

It is to be understood that the examples presented herein are intended to be merely illustrative of the invention and not as limiting it in any manner; nor is the invention to be limited by any theory regarding its operability. The scope of the invention is to be determined by the appended claims.

What is claimed is:

1. An oil composition comprising a hydrocarbon oil to which has been added from about 0.0005 to about 10 percent by weight of a 1-aza bicycloalkane additive selected from the group consisting of:

(a) 1-aza bicyclo octane of the formula

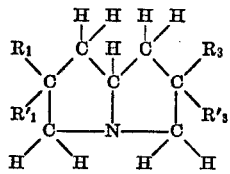

wherein at least one of the groups R, R′$_1$, R$_3$ and R′$_3$ is C$_1$ to C$_{16}$ alkyl, and each of the remaining of said groups is either hydrogen or C$_1$–C$_{16}$ alkyl; and (b) 1-aza bicyclo nonane of the formula

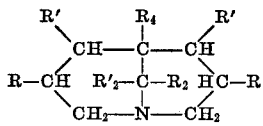

wherein each of R, R′, R′$_2$, and R$_2$ is either hydrogen or methyl, and wherein R$_4$ is hydrogen or C$_1$–C$_{12}$ alkyl.

2. Composition is defined by claim 1 wherein said additive is 1-aza-5-isopropyl-9-methyl bicyclo (3.3.1.) nonane.

3. Composition is defined by claim 1 wherein said additive is 1-aza-5,9-dimethyl bicyclo (3.3.1.) nonane.

4. Composition is defined by claim 1 wherein said additive is a 1-aza-9-methyl 5 (C$_1$–C$_{12}$ alkyl) bicyclo (3.3.1.) nonane.

5. The composition of claim 1 wherein said additive is a 1-aza-3,7 di(C$_1$–C$_{16}$ alkyl) bicyclo (3.3.0) octane.

6. The composition of claim 1 wherein said additive is a 1-aza-3,3,7,7-tetra(C$_1$–C$_{16}$ alkyl)bicyclo (3.3.0.) octane.

7. The composition of claim 1 wherein said additive is 1-aza-3,3,7,7-tetramethyl bicyclo (3.3.0.) octane.

8. The composition of claim 1 wherein said oil is selected from the group consisting of gasolines, middle distillate fuels and lubricating oils.

9. The composition of claim 1 wherein said oil is a lubricating oil.

10. The composition of claim 1 wherein said oil is a middle distillate fuel oil.

11. The composition of claim 1 wherein said oil is a jet fuel oil.

12. An additive concentrate comprising from about 20 to about 90 percent by weight of a hydrocarbon solvent and from about 10 to about 80 percent by weight of a 1-aza bicyclo alkane selected from the group consisting of:

a 1-aza bicyclo octane of the formula

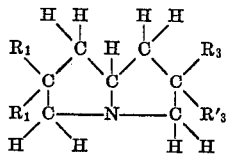

wherein at least one of the groups R, R′$_1$, R$_3$ and R′$_3$ is C$_1$ to C$_{16}$ alkyl, and each of the remaining of said groups is either hydrogen or C$_1$–C$_{16}$ alkyl; and a 1-aza bicyclo nonane of the formula

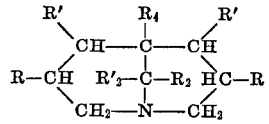

wherein each of R, R′, R′$_2$, and R$_2$ is either hydrogen or methyl, and wherein R$_4$ is hydrogen or C$_1$–C$_{12}$ is alkyl.

13. Additive concentrate as defined by claim 12 wherein said additive is a 1-aza-3,7 di (C$_1$–C$_{16}$ alkyl) bicyclo (3.3.0.) octane.

14. Additive concentrate as defined by claim 12 wherein said additive is a 1-aza-3,3,7,7-tetra (C$_1$–C$_{16}$ alkyl) bicyclo (3.3.0.) octane.

15. Additive concentrate as defined in claim 12 wherein said additive is a 1-aza-9-methyl-5 (C$_1$–C$_{12}$ alkyl) bicyclo (3.3.1.) nonane.

16. Additive concentrate as defined by claim 12 wherein said additive is 1-aza-5-isopropyl-9-methyl bicyclo (3.3.1.) nonane.

17. Additive concentrate as defined by claim 12 wherein said additive is 1-aza-5,9-dimethyl bicyclo (3.3.1.) nonane.

References Cited

UNITED STATES PATENTS

| | | | |
|---|---|---|---|
| 2,684,292 | 7/1954 | Caron et al. | 44—63X |
| 2,832,741 | 4/1958 | Gottshall et al. | 252—50 |
| 2,973,368 | 2/1961 | Rice et al. | 252—51.5X |
| 3,475,412 | 10/1969 | Peterli et al. | 252—50X |

DANIEL E. WYMAN, Primary Examiner

W. J. SHINE, Assistant Examiner

U.S. Cl. X.R.

44—63